United States Patent [19]

Edberg

[11] Patent Number: 4,628,180
[45] Date of Patent: Dec. 9, 1986

[54] WELDING SYSTEM FOR TIG WELDING

[76] Inventor: Heini Edberg, Kirkevej 15, 4930 Maribo, Denmark

[21] Appl. No.: 711,470
[22] PCT Filed: May 25, 1984
[86] PCT No.: PCT/DK84/00049
 § 371 Date: Feb. 15, 1985
 § 102(e) Date: Feb. 15, 1985
[87] PCT Pub. No.: WO85/00024
 PCT Pub. Date: Jan. 3, 1985

[30] Foreign Application Priority Data

Jun. 15, 1983 [DK] Denmark ............... 2742/83

[51] Int. Cl.⁴ ............................................. B23K 9/06
[52] U.S. Cl. ........................... 219/124.01; 219/130.4; 219/130.5
[58] Field of Search ...................... 219/130.21, 130.32, 219/130.4, 130.5, 132, 124.01

[56] References Cited

U.S. PATENT DOCUMENTS 2,617,913 11/1952 Oestreicher .................. 219/132

FOREIGN PATENT DOCUMENTS 3219232 12/1982 Fed. Rep. of Germany .
2407703  8/1985 Fed. Rep. of Germany .
 758300 10/1956 United Kingdom .
 881531 11/1961 United Kingdom .
 907205 10/1962 United Kingdom ............. 219/130.4
2054293  2/1981 United Kingdom .

OTHER PUBLICATIONS

"Touch Start Techniques for TIG Welding"—R. A. Willgoss, *Welding and Metal Fabrication*, May 1984.

Primary Examiner—E. A. Goldberg
Assistant Examiner—C. M. Sigda
Attorney, Agent, or Firm—Merchant, Gould, Smith, Edell, Welter & Schmidt

[57] ABSTRACT

TIG welding with an electronic operating scrape ignition circuit, which by lifting the welding electrode (6) is activated by an idle voltage control (7) in such a way that the welding current quickly is raised above the basic current, thereby an electric welding arc is established without using high voltage. Because of the low welding current initially, under 10 amp, the system is very suited for welding thin plates.

4 Claims, 1 Drawing Figure

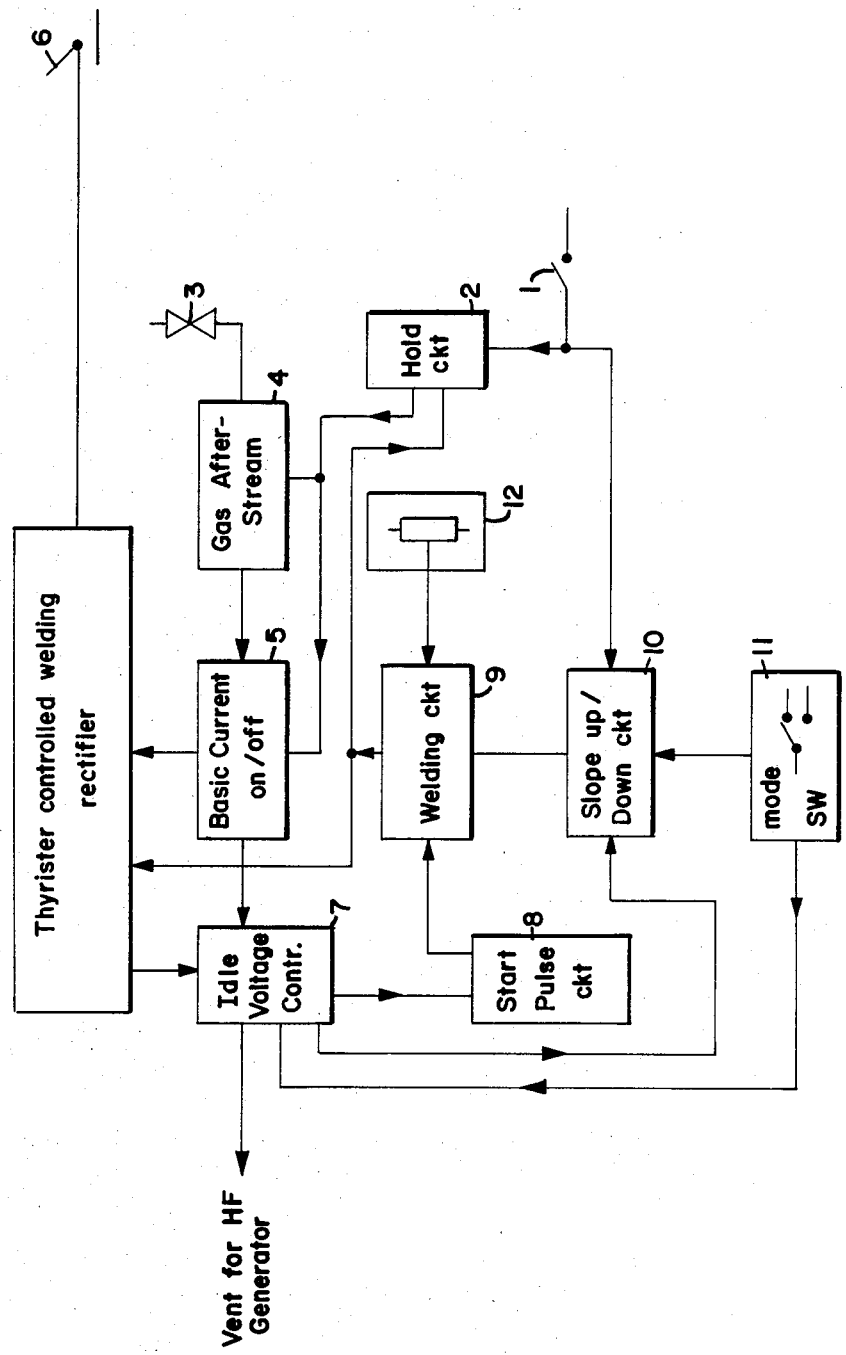

WELDING SYSTEM FOR TIG WELDING

The present invention concerns an electronic circuit, which is meant to be mounted on operating welding rectifiers with a basic current supply circuit.

The operation of the welding system known as TIG (Tungsten Inert Gas) welding can be split into two systems depending on the way on which the welding is started. The first system uses scrape ignition, when the electric arc is established by scraping the electrode against the welding subject until a spark is obtained. Unfortunately, this method will cause a 'drag' in the material by starting and stoping, and tungsten material will be left on the workpiece, which means that the welding will not be of good workmanship. In addition the welding electrode must be taken out and grinding frequently. Another system uses a contact-less start by means of a high voltage generator, which will start the arc when the spark is established on the welding subject. The drawback of this system is that the spark will move in a circle on the welding subject, and one cannot precisely control where the welding is started. Furthermore this system is very expensive.

From British patent specification No. 2,054,293 a welding system is known which counteracts the drawbacks of the scrape ignition. By this system one obtains a soft start by coupling together a high tension via a separate transformer winding with an associated rectifier, and which is synchronized with the AC power line frequency. When the electric arc is established, it electronically changes over to a normal slope-up circuit with a new rectifier. Still, it is a rather expensive method compared to advanced scrape ignition which also requires an expensive choke coil. The user also has the possibility of getting an electric shock if he uses filler metal.

The invention differs from the known systems because it does not use high voltage to start up, and the current adjustment takes place with current regulation.

The invention comprises an electronically controlled circuit which is meant to be mounted on operated welding rectifiers with a basic current supply circuit.

The unusual thing about the invention is that the welding electrode can be placed directly on the welding subject without the welding arc having been established, because a basic current or only 3-8 amp will flow into the electrode. At the moment the electrode is lifted from the welding subject the basic current will be raised to twice as much as the preset welding current, and an arc is established. Hereafter the current is lowered immediately to the value the slope-up function has achieved. The slope-up function of the operating circuit regulates thereafter the current change up to the preset welding current. If the welding subject is touched during the welding the operated circuit will regulate the welding current down to a basic current level, which protects the electrode.

When the button on the welding handle is depressed, a down-slope will take place, which brings about the slow lowering of the welding current to basic current level and the welding stops. The slope functions causes that one avoids the above-mentioned 'drag' in the material.

During welding with the preset welding current it is possible, by triggering a burner switch, to pulsate the welding current for controlling the melting bath. The control circuit also regulates the gas-stream through the magnetic valve in a way in which one gets both before- and after-streaming of argon. This is done to make the start easier and to avoid oxidizing the electrode during cooling.

The advantages of the invention are that a 'drag' is avoided and that one can very precisely decide where to start the welding.

The invention will be described as follows in terms of the embodiment described below.

FIG. 1 shows a block diagram using the invention.

The welding system has to be connected with a thyristor-operated welding rectifier with internal basic current supply circuit. The type of welding is determined by MODE switch (11) where the TIG type welding can be selected. The tungsten electrode on the welding handle (6) is placed on the welding subject. The switch on the welding handle (1) is actuated, and maintenance circuit (2) is activated. The magnetic valve (3) opens and the gas-flow (circle 4) starts. After the gas-flow has stopped the basic current supply circuit on-off switch (5) is activated, which turns on the basic current to the electrode (6). When the electrode is lifted slightly from the welding subject the welding electric arc and the idle voltage control (7) is activated. This will activate the start pulse circuit (8). This implies that the welding current circuit (9) soon lifts the welding current to establish a stable welding arc of a value greater than the preset value on the control. After a stable arc is obtained the current will fall to a little above basic current value. Simultaneously with the establishment of the arc, the control of the welding arc (7) will begin the slope-up function (10). This implies that the welding current will, in a short time, rise to preset value (12).

When you wish to stop the welding the TIG burner switch (1) is turned off, by means of which the slope-down regulator (10) starts to regulate down via the regulation circuit (9). When the regulation to the basic current level is obtained, the holding circuit (2) is set to zero and the basic current on-off circuit (5) turns off the basic current in the welding rectifier. At the same time it starts the time for the gas after-flow (4). After that the magnetic valve (3) is turned off, and gas after-flow is stopped. The time allowed for after-flow prevents oxidizing the electrode during the cooling.

When using the system for tack-welding the MODE switch is placed in position for tack-welding. The welding works in the same way, as by TIG welding though the up and down slope time is shortened to milliseconds.

By use of the system for electrode welding the MODE switch is placed in position for electrode welding. This implies that the basic current circuit is constantly activated. The slope function (10) and the gas regulating circuit (4) are decoupled. One can now carry out a normal electrode welding with suitable equipment.

I claim:

1. Method of electronically controlling starting of TIG welding comprising the steps of: bringing a tungsten electrode into momentary contact with an object to be welded, then separating the electrode from said object to initiate an arc, providing a low short-circuit current at the contact and at the separation of said contact the current is increased to a value above a predetermined welding current, and thereupon, after a short period of time, the current is decreased to said predetermined welding current value.

2. Method of electronic control according to claim 1, wherein any subsequent contact between the tungsten electrode and the object to be welded during the welding process will immediately decrease the welding current to said low short-circuit current value.

3. Method of electronic control according to claim 1, wherein the welding current maybe decreased to a predetermined value by alternatively closing a switch which will initiate a gradual slope-down of the welding current to said low current value, whereupon the power supply is turned off.

4. Method of electronic control according to claim 1, wherein said low short-circuit current is generally 3 to 8 amps.

* * * * *

REEXAMINATION CERTIFICATE (1860th)

United States Patent [19]

Edberg

[11] B1 4,628,180

[45] Certificate Issued Dec. 1, 1992

[54] WELDING SYSTEM FOR TIG WELDING

[76] Inventor: Heini Edberg, Kirkevej 15, 4930 Maribo, Denmark

Reexamination Request:
No. 90/002,482, Oct. 16, 1991

Reexamination Certificate for:
Patent No.: 4,628,180
Issued: Dec. 9, 1986
Appl. No.: 711,470
Filed: Feb. 15, 1985

[22] PCT Filed: May 25, 1984
[86] PCT No.: PCT/DK84/00049
§ 371 Date: Feb. 15, 1985
§ 102(e) Date: Feb. 15, 1985
[87] PCT Pub. No.: WO85/00024
PCT Pub. Date: Jan. 3, 1985

[30] Foreign Application Priority Data
Jun. 15, 1983 [DK] Denmark ............................ 2742/83

[51] Int. Cl.⁵ .................................................. B23K 9/06
[52] U.S. Cl. ............................ 219/124.01; 219/130.4; 219/130.5
[58] Field of Search ............... 219/124.01, 130.4, 130.5

[56] References Cited
FOREIGN PATENT DOCUMENTS
2459309 6/1976 Fed. Rep. of Germany .

OTHER PUBLICATIONS
Brown, M. J., "Initiation of a Tungsten Inert Gas Arc by High Voltage D.C." The Welding Inst., Cambridge, England, Dec. 1976.

*Primary Examiner*—Clifford C. Shaw

[57] ABSTRACT

TIG welding with an electronic operating scrape ignition circuit, which by lifting the welding electrode (6) is activated by an idle voltage control (7) in such a way that the welding current quickly is raised above the basic current, thereby an electric welding arc is established without using high voltage. Because of the low welding current initially, under 10 amp, the system is very suited for welding thin plates.

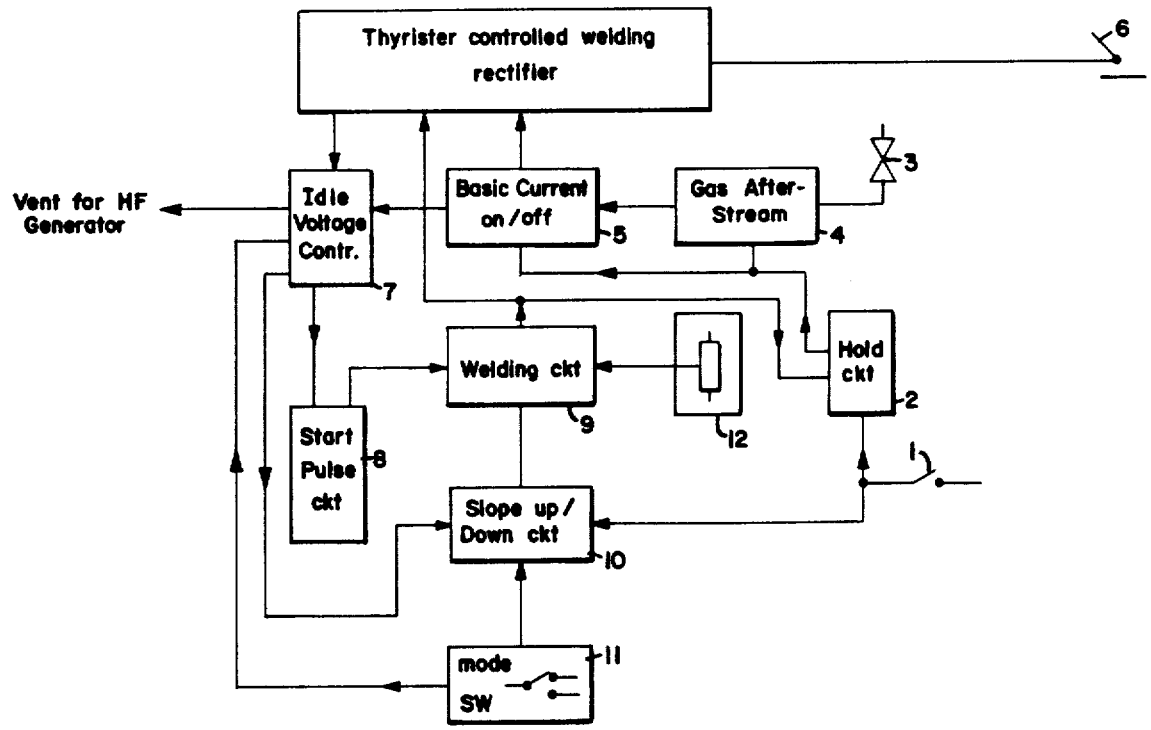

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2 and 3 is confirmed.

Claims 1 and 4 are cancelled.

* * * * *